United States Patent
Ollila

(10) Patent No.: US 9,749,536 B2
(45) Date of Patent: Aug. 29, 2017

(54) FERROFLUID MATERIAL INTERFACE FOR MAGNETIC SHAPE-MEMORY ELEMENT CONFIGURATION

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 14/747,266

(22) Filed: Jun. 23, 2015

(65) Prior Publication Data

US 2016/0381294 A1 Dec. 29, 2016

(51) Int. Cl.
*H01F 30/14* (2006.01)
*H04N 5/232* (2006.01)

(52) U.S. Cl.
CPC .............................. *H04N 5/23287* (2013.01)

(58) Field of Classification Search
CPC ....................................................... H01L 41/12
See application file for complete search history.

(56) References Cited

U.S. PATENT DOCUMENTS

| | | | |
|---|---|---|---|
| 5,955,934 A * | 9/1999 | Raj | ........................ H01F 7/088 335/229 |
| 7,646,545 B2 | 1/2010 | Tanaka | |
| 8,102,230 B2 * | 1/2012 | Eriksen | ..................... H01F 1/44 336/178 |
| 8,253,094 B2 | 8/2012 | Huang et al. | |
| 8,731,390 B2 | 5/2014 | Goldenberg et al. | |
| 9,450,170 B2 * | 9/2016 | Schiepp | ................... H01L 41/12 |
| 2004/0263299 A1 * | 12/2004 | Noji | .......................... F16F 6/00 335/229 |
| 2006/0261680 A1 | 11/2006 | Moon et al. | |
| 2007/0127146 A1 | 6/2007 | Moon et al. | |
| 2007/0286597 A1 | 12/2007 | Hopper | |
| 2011/0116664 A1 * | 5/2011 | Fujioka | ................... H01L 41/12 381/190 |
| 2011/0122495 A1 | 5/2011 | Togashi | |
| 2013/0002392 A1 * | 1/2013 | Parashar | ............. H01F 41/0233 336/234 |
| 2014/0091646 A1 * | 4/2014 | Schiepp | ................... H01L 41/12 310/26 |

(Continued)

OTHER PUBLICATIONS

Ollila, Mikko; U.S. Appl. No. 14/747,234 entitled "Magnetic Fluid Shutter Operation" filed Jun. 23, 2015, US Application, Drawings and Filing Receipt dated Jul. 6, 2015, 28 pages.

(Continued)

*Primary Examiner* — Alexander Talpalatski
(74) *Attorney, Agent, or Firm* — International IP Law Group, P.L.L.C.

(57) ABSTRACT

The present techniques are related to a system and method for increasing the magnetic flux applied to a magnetic shape-memory (MSM) element. The method includes generating a magnetic field by applying a current through a transformer core. The method includes directing the magnetic field to configure a position of the MSM element. The method includes propagating the magnetic field through a ferrofluid at an interface between the transformer core and the MSM element. The method also includes increasing the permeability of a magnetic flux of the magnetic field across the MSM element.

25 Claims, 8 Drawing Sheets

(56) References Cited

U.S. PATENT DOCUMENTS

2015/0054359 A1* 2/2015 Schiepp .................. H01L 41/12
                                                              310/26

OTHER PUBLICATIONS

Ollila, Mikko; U.S. Appl. No. 14/863,884 entitled "Magnetic Fluid Opticle Image Stabilization" filed Sep. 24, 2015, US Application, Drawings and Filing Receipt dated Oct. 8, 2015, 31 pages.
Ollila, Mikko; U.S. Appl. No. 14/863,944 entitled "MEMS Led Zoom" filed Sep. 24, 2015, US Application, Drawings and Filing Receipt dated Oct. 9, 2015, 35 pages.
Ollila, Mikko; U.S. Appl. No. 14/497,859 entitled "Techniques for Optical Image Stabilization Using Magnetic Shape Memory Actuators" filed Sep. 26, 2014, 81 pages.
Assadsangabi, Babak, et al.; Planar Variable Inductor Controlled by Ferrofluid Actuation; IEEE Transactions on Magnetics, vol. 49, No. 4, dated Apr. 2013. 5 pages, Johor, Malaysia.
Ollila, Mikko: U.S. Appl. No. 14/747,234 entitled "Magnetic Fluid Shutter Operation" filed Jun. 23, 2015, 37 pages.

* cited by examiner

200

300

400

500

600

800

FERROFLUID MATERIAL INTERFACE FOR MAGNETIC SHAPE-MEMORY ELEMENT CONFIGURATION

FIELD

The present techniques generally relate to magnetic shape-memory alloys or elements that exhibit strain when a magnetic field is applied. More specifically, the present techniques relate to a magnetic shape-memory (MSM) device implemented with a unique interface.

BACKGROUND

A magnetic shape-memory element is a ferromagnetic material that undergoes a phase transformation when under the influence of an applied magnetic field. The phase transformation is known as a martensitic phase transformation, based on the magnetic anisotropy of the MSM element. This phase change may be diffusion-less transformation that occurs by the homogeneous movement of atoms without long-range diffusion that results in a change in crystal structure. In some cases a separation distance between a MSM element and a magnetic core that produces the magnetic field may result in a lower magnetic flux applied across that distance.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
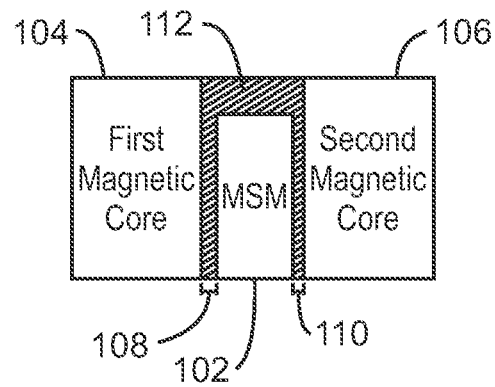
FIG. 1A is a block diagram of an apparatus with an MSM element in an initial state.

Various embodiments are generally directed to techniques for using magnetic shape memory (MSM) elements configured as actuators to minimize the consumption of electric power and/or the quantity of components in implementing, for example, optical image stabilization (OIS) in an image capture system. An MSM actuator may include a MSM element wherein a portion of material changes in dimension and/or a shape as a result of a molecular level response to a magnetic field. Such a change in dimension and/or shape can be made to occur quickly and can be used to exert a considerable amount of mechanical force, in comparison to mechanical actuator systems.

The techniques described herein include disposing a ferromagnetic compound, such as a ferrofluid material, at an interface between an MSM element of an actuator and a magnetic core of the actuator. In other words, the MSM element may be surrounded by the ferromagnetic compound that can readily flow and alter its shape while providing an increase in magnetic permeability at the interface of the MSM element and the magnetic core.

As discussed above, containing the MSM element with an interface filled with a ferrofluid material increases the permeability of the magnetic flux applied across the MSM element. The increase of the magnetic flux at the MSM element can serve to improve the function of the MSM actuator, for example. In some examples, multiple MSM actuators arranged to exert opposing mechanical forces may be incorporated into an image capture system, such as a camera of a computing device to implement OIS. Indications of movement received from one or more sensors may be employed to reduce motion artifacts of image capture. Measurements of electrical characteristics of one or more of the multiple MSM actuators may be employed to determine a current position the camera as it is moved about by the multiple MSM actuators. The multiple MSM actuators may then be selectively provided with electric power to generate countering movement at the camera to counter the unintended motion of the camera during image capture. Further, in some cases, electric power may be conserved by reducing electric power provided to the MSM actuators at times when such countering movements are unnecessary.

A driver circuit employed to operate multiple MSM actuators incorporated into the portable electronic device may be operable to use electrical measurements associated with MSM actuator components, such as magnetic coils, magnetic cores, the MSM element itself, or any combination thereof. The measurements may be used to determine a current position of a camera component in OIS operations. Such measurements may, in some embodiments, be gathered as electric power is applied to one or more of the multiple MSM actuators to move a given portion of the camera. The current position and movement of that portion may be taken into account in deriving a countering movement for OIS operations.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1A is a block diagram of an apparatus with an MSM element 102 in an initial state 101. The MSM element 102 is configured according to techniques described herein. The MSM element 102 changes a dimension and/or a shape as a result of a molecular level response to a magnetic field. The magnetic field is produced when a current is generated through coil wound around a first magnetic core 104, and/or a second magnetic core 106. The magnetic field is applied across a first interface 108 to the MSM element 102 from the first magnetic core 104, and across a second interface 110 to the MSM element 102 from the second magnetic core 106.

In examples, a ferrofluid material 112 may be disposed at the first interface 108 and the second interface 110. The ferrofluid material 112 may have properties of a liquid at room temperature, and may be configured to flow freely about the interface surrounding the MSM element 102. In examples, the ferrofluid material 112 increases the magnetic flux through the MSM element 102, allowing for more efficient and effective compression and elongation of the MSM element 102.

Figure 1B:
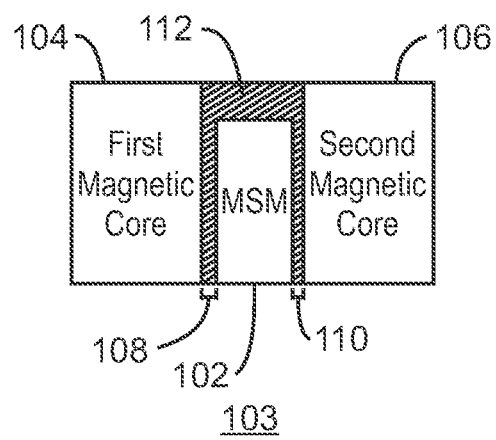
FIG. 1B is a block diagram of an apparatus with an MSM element in a compressed state.

FIG. 1B is a block diagram of an apparatus with an MSM element 102 in a compressed state 103. The MSM element 102 is shown in a compressed state as a magnetic field is being applied to the MSM element 102 by the first and second magnetic cores 104, 106. The volume of the MSM element 102 may remain constant while the thickness of the MSM element 102 changes as the MSM element 102 is compressed. A width of the first interface 108 and a second interface 110 are decreased as a result of the full compression of the MSM element 102. In examples, the widths of the first and second interface 108, 110 in the compressed state 103 may be narrower than a width of an interface that exist in the apparatus when the MSM element 102 is in an initial state 101, as illustrated in FIG. 1A. To reduce the magnetic resistance across the first and second interfaces 108, 110, the interfaces are filled with a ferrofluid material 112. The ferrofluid material 112 is free to move and flow in the interface surrounding the MSM element 102. In some cases, the presence of the ferrofluid material 112 in the interface improves heat transfer from the MSM element 102 and decreases the likelihood that the MSM element 102 will buckle due to some structural failure. In some cases, the ferrofluid material 102 is configured to increase the magnetic flux applied to the MSM element 102, thereby improving the function of the MSM element 102 in the apparatus 100. Thus, the low-permeability magnetic barrier of an empty interface or air gap is eliminated by a higher permeability of magnetic flux enabled by introducing the ferrofluid material 112.

Figure 1C:
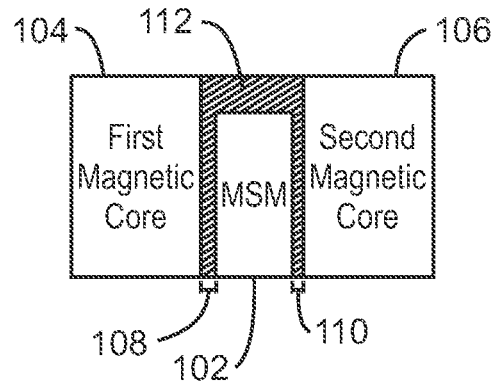
FIG. 1C is a block diagram of an apparatus with an MSM element in an extended state.

FIG. 1C is a block diagram of an apparatus with an MSM element 102 in an extended state 105. Like numbered items can be described, for example, with respect to those defined in FIGS. 1A and 1B. The MSM element 102 is shown in an elongated position. In FIG. 1C, while the volume of the MSM element 102 does not change, the width may change considerably when the MSM element 102 is extended lengthwise when a magnetic flux is applied across the MSM element 102. While the MSM element 102 is in an extended position, the first interface 108 and the second interface 110 are formed between the MSM element 102 and the first magnetic core 104 and second magnetic core 106 creating the magnetic flux.

The first and second interface 108, 110 of FIG. 1C are wider than the first and second interface 108, 110 of FIG. 1B, for example, illustrating the MSM element 102 in a fully compressed state. The increased width generally decreases the magnetic permeability of a magnetic field, and thus the magnetic flux applied across the MSM element 102 is diminished. In examples, the ferrofluid material 112 is included in the interface of the first and second interface 108, 110. The ferrofluid material 112 is generally malleable, readily forms to the contour of the surroundings, and is a significant means to reduce the resistance of the magnetic field from the first and second magnetic cores 104, 106, and increase the magnetic flux that is ultimately applied to the MSM element 102. In an instance where the apparatus 100 is used in fields related to audio technology and sensitive audio microphones, for example, the MSM element 102 is reinforced by the ferrofluid material 112 surrounding it, thereby reducing noise by reducing vibration and buckling in the structure of the MSM element 102.

The diagram of FIGS. 1A, 1B, and 1C are not intended to indicate that the apparatus 100 is to include all of the components shown in FIGS. 1A, 1B, and 1C. Any number of additional components may be included within each apparatus 101, 103, 105, depending on the details of the devices and specific implementation of the ferrofluid material 112 described herein. The items discussed are not limited to the functionalities mentioned, but the functions could be done in different places, or by different components. For example, the magnetic field can be produced by either the first or second magnetic cores 104, 106, a combination thereof, or a different suitable component.

Figure 2:
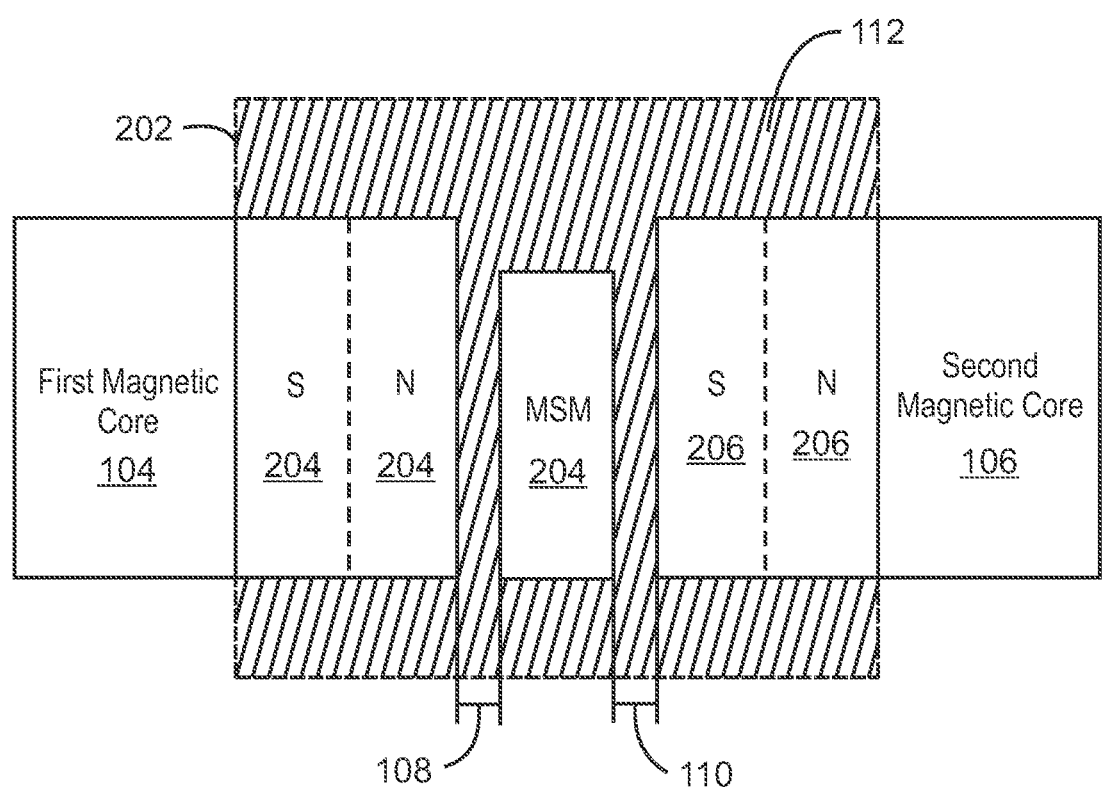
FIG. 2 is a block diagram of an apparatus with an MSM element that utilizes a ferrofluid material in an interface and a set of magnets for increased stability.

FIG. 2 is a block diagram of an apparatus 200 with an MSM element 102 that utilizes a ferrofluid material 112. In FIG. 2, the ferrofluid material 112 is disposed in a container 202, and a set of magnets 204, 206 are included in the apparatus 200 for increased structural stability, and to ensure the ferrofluid material 112 remains at a preferred position within a first interface 108 and second interface 110. Like numbered items can be described, for example, with respect to those defined in FIGS. 1A, 1B, and 1C. The container 202 is configured to retain the ferrofluid material 112 between a first magnetic core 104, a second magnetic core 106, and the MSM element 102. The apparatus 200 includes a first magnet 204 and a second magnet 206. The first and second magnets 204, 206 are configured to attract the ferromagnetic ferrofluid material 112 to direct the magnetic field across the MSM element 102. In some cases, the first magnet 204 and the second magnet 206 may be configured to maintain the ferrofluid material 112 in the container 202 and within the first and second interfaces 108, 110 between the MSM element 102 and first and second magnetic cores 104, 106. In examples, the container 202 can be made of a flexible material to accommodate the ferrofluid material 112 when it is forced out of the first and second interfaces 108, 110 when the MSM element 102 is in a fully compressed state. If the first and second magnets 204, 206 are oriented in the same direction between the first and second magnetic cores 104, 106, the magnetic field becomes stronger. If the first and second magnets are oriented in opposite directions to one another, the ferrofluid material 112 may separate into different fluid concentrations in different areas of the container 202. Thus, in examples, the first and second magnet 204, 206 are oriented in the same direction relative to one another to improve the stability and positioning of the ferrofluid material 112 within the container 202.

The diagram of FIG. 2 is not intended to indicate that the apparatus 200 is to include all of the components shown in FIG. 2. Any number of additional components may be included within the apparatus 200, depending on the details of the devices and specific implementation of the ferrofluid material 112 described herein. The items discussed are not limited to the functionalities mentioned, but the functions could be done in different places, or by different components. For example, the container 202 can be placed under an amount of pressure to ensure the ferrofluid material 112 is directed to the interface between the MSM element 102 and first and second magnetic cores 104, 106 as the MSM element 102 changes shape.

Figure 3:
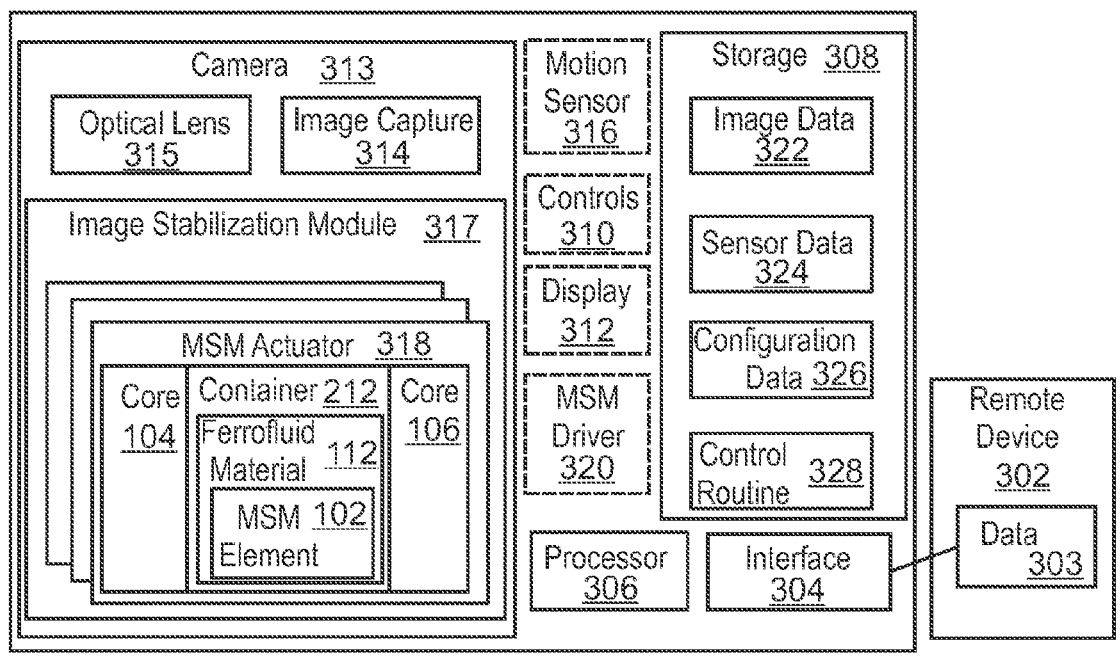
FIG. 3 is a block diagram of an example computing device incorporating optical image stabilization (OIS) techniques with an MSM element surrounded by a ferrofluid material in a container.

FIG. 3 is a block diagram of an example computing device 300 incorporating OIS techniques with an MSM element 102 surrounded by a ferrofluid material 112 in a container 202. Like numbered items can be described, for example, with respect to those defined in FIGS. 1A, 1B, 1C, and 2. The computing device 300 can be connected to a remote device 302 via an interface 304 and over a network, for example. In various embodiments, the computing device 300 may incorporate one or more of a processor 306, a storage device 308, controls 310, and a display 312. The computing device 300 may also include a camera 313, including an image capture element 314, an optic lens 315, motion sensor(s) 316, and the like. The computing device 300 can also include multiple MSM actuators 318 having a ferrofluid material 112 disposed at an interface between an MSM element 102 and a first and second magnetic core 104, 106, such as the interfaces 108 and 110 discussed above in regard to FIG. 1 and FIG. 2. The computing device 300 can also include an MSM driver 320 to control the MSM actuators 318. The storage 308 may store one or more of image data 322, sensor data 324, configuration data 326, and a control routine 328.

As discussed above, the camera 313 may incorporate the image capture element 314 and the optic lens 315. The camera 313 can also include an image stabilization module 317 to implement OIS techniques. Further, the multiple MSM actuators 318 may include one or more of individual MSM elements 102, which may each be arranged to exert force in opposition to the other to pivot the camera 313, as discussed in more detail below in regard to FIG. 5 and FIG. 6. As also depicted, the computing device 300 may be implemented either in a single-piece form in which at least the majority of its components are incorporated into a single casing, or in a multiple-piece form in which at least the majority of its components are distributed among two or more physically separate casings that may be coupled by electrically and/or optically conductive cable to exchange signals.

The computing device 300 and the remote device 302 may exchange image data 322 that may be captured by the camera 313 of the computing device 300. The camera 313 may be caused to move relative to at least a portion of a casing of the computing device 300 by multiple MSM actuators 318 as part of providing optical image stabilization to improve the quality of the images captured by the camera 313 and stored as the image data 322. The multiple MSM actuators 318 may be operated to provide OIS by the MSM driver 320 under the control of a control routine 328 in response to movements of the computing device 300. For example, movements may occur as a result of a person physically moving the computing device 300 with one or both hands during image capture.

In some cases, the computing device 300 and remote device 302 may be computing devices that can exchange signals conveying data (e.g., the image data 322) through a network, for example. In examples, the computing device 300 may include a wearable computing device, such as eyewear, for example, a mobile computing device, or any combination of computing devices wherein OIS may be employed. One or more of these computing devices 300 may exchange other data entirely unrelated to captured images, the capturing of images and/or the provision of OIS for capturing images with each other and/or with still other computing devices (not shown) via the network. The network may be a single network possibly limited to extending within a single building or other relatively limited area, a combination of connected networks possibly extending a considerable distance, and/or may include the Internet. Thus, the network may be based on any of a variety (or combination) of communications technologies by which signals may be exchanged, including without limitation, wired technologies employing electrically and/or optically conductive cabling, and wireless technologies employing infrared, radio frequency or other forms of wireless transmission. In alternate embodiments, the computing device 300 and the remote device may be coupled in an entirely different manner. In still other embodiments, the image data 322 may be conveyed among these computing devices via removable media (e.g., a FLASH memory card, optical disk, magnetic disk, etc.).

The control routine 328 incorporates a sequence of instructions operative on the processor 306 in its role as a main processor component of the computing device 300 to implement logic to perform various functions. In executing the control routine 328, the processor 306 may operate at least the image capture element 314 of the camera 313 to capture images, and may store digital data representing the captured images as the image data 322 in the storage 308. The images so captured may be individual still images or may be a sequence of images captured at a regular interval of time to form motion video.

The diagram of FIG. 3 is not intended to indicate that the computing device 300 is to include all of the components shown in FIG. 3. Any number of additional components may be included within the computing device 300, depending on the details of the devices and specific implementation of the ferrofluid material 112 and OIS techniques described herein. For example, the items discussed are not limited to the functionalities mentioned, but the functions could be done in different places, or by different components.

Figure 4:
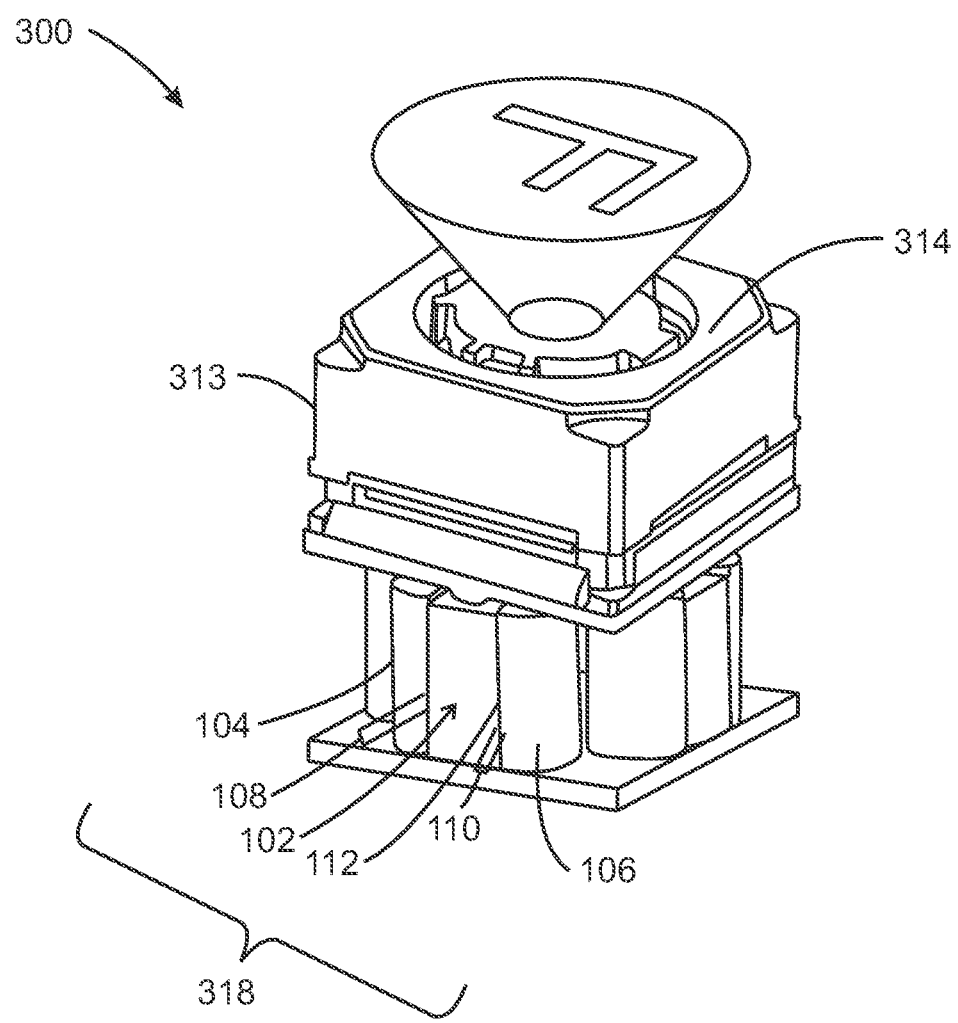
FIG. 4 depicts an example embodiment of a configuration of an OIS system.

FIG. 4 depicts an example embodiment of a configuration 400 of an OIS system. In FIG. 4, the configuration 400 of the OIS system includes MSM actuators, such as the MSM actuators 318 discussed above in regard to FIG. 1A and FIG. 3. The MSM actuator 318 may include a ferrofluid material 112 in an interface, such as the interfaces 108 and 110 discussed above in regard to FIG. 1A, 1B, 1C, and FIG. 2. The MSM actuator 318 can be the same as described with respect to FIGS. 1A, 1B, 1C, FIG. 2, and FIG. 3, for example, and include stabilizing magnets, MSM elements 102, magnetic cores 104 and 106, and the ferrofluid material 112 to increase magnetic flux across the MSM actuator 318. The configuration 400 may also include an image capture element 314, optical lens 315, and camera 313 mounted to the MSM actuators 318.

In some embodiments, two pairs of MSM actuators 318 may be employed to the camera 313 in a pivoting manner to pivot a line of sight of the image capture element 314 of the camera 313 to provide OIS. Such pivoting movement may be configured to mimic the motion of a human eyeball within an eye socket to pivot the line of sight of the camera 313 by an angle to counter a movement determined to arise from unsteady support of the optical image stabilization system 300. The pivoting may be enabled to occur in two angular dimensions, each under the control of one of the pairs of MSM actuators 318. In some embodiments, the camera 313 may be physically coupled to a portion of the interior of the casing of the OIS system 400 by being mounted at least partially within the interior space of a gimbal to enable the pivoting movement of the camera 313 under the control of the two pairs of MSM actuators 318. In other embodiments, the camera 313 may be physically coupled to a portion of the interior of the casing by being mounted thereto through a universal joint to enable the pivoting movement of the camera 313 under the control of the two pairs of MSM actuators 318.

In examples, within each of the pairs of MSM actuators 318, each of the two MSM actuators 318 may be selected and/or configured to exert force in a direction opposite the other. The two MSM actuators 318 of at least one of the pairs may be rigidly coupled to each other to form what may be referred to as a "push-push" double actuator that is coupled to the camera 313 by a single linkage. Force in either of the two opposing directions may be exerted on the camera 313 through that single linkage depending on which one of the two MSM actuators 318 is driven with electric power including a magnetic current. Alternatively or additionally, the two MSM actuators 318 of at least one other of the pairs may be indirectly coupled through separate linkages of each of the two MSM actuators 318 to the camera 313 in a manner that each may exert a force in opposition to the other indirectly through the camera 313. Regardless of the exact manner in which MSM actuators 318 within each pair may act in opposition to each other, all four of the MSM actuators 318 may be of a generally elongate physical configuration. Further, all four of the MSM actuators 318 may be arranged to extend lengthwise within an elongate portion of a casing that defines, is formed integrally with, or is otherwise physically coupled to at least a front-end piece of a temple of eyewear in embodiments in which the optical image stabilization system 300 is the eyewear or is incorporated into the eyewear (e.g., eyeglasses, reading glasses, smart glasses, etc.). In examples, the multiple MSM actuators 318 may be positioned around the periphery of the lens 313 to enable each to engage an edge of the lens 313 (or of a frame that may hold the lens 313) from differing directions.

In other embodiments, a triplet of MSM actuators 318 may be employed to move at least a lens 315 of the camera 313 separately from at least an image capture element 314 of the camera 313 to provide OIS. In other words, at least one component of the camera 313 may be made movable relative to at least one other component of the camera 313. More specifically, the lens 315 may be moved by the MSM actuators 318 in two dimensions within a plane that crosses a line of sight of the image capture element 314 to use refraction to bend light following the line of sight by a relatively small angle to counter a relatively small movement determined to arise from unsteady support of the optical image stabilization system 300. At least the image capture element 314 of the camera 313 may be supported within a casing of the optical image stabilization system 300 in a manner that prevents at least the image capture element 314 from moving relative to the casing. At least the lens 315 may be supported with at least a sliding pivot point that is off center from the center of the lens 315, that enables a sliding movement of at least the lens 315 at a non-perpendicular angle with respect to the direction(s) in which one or more of the MSM actuators 318 exerts force, and that enables pivoting of at least the lens 315 about the sliding pivot point. Two of the MSM actuators 318 may be selected and/or configured to exert force to move at least the lens 315 in a manner causing the sliding and/or pivoting movements of at least the lens 315 in a direction away from a resting position of at least the lens 315. A third one of the MSM actuators 318 may be selected and/or configured to exert force in opposition to the force exerted by the other two MSM actuators 318 to move at least the lens 315 back towards the resting position.

The diagram of FIG. 4 is not intended to indicate that the OIS system 400 is to include all of the components shown in FIG. 4. Any number of additional components may be included within the OIS system 400, depending on the details of the devices and specific implementation of the ferrofluid material 112 and OIS techniques described herein. For example, the items discussed are not limited to the functionalities mentioned, but the functions could be done in different places, or by different components.

Figure 5:
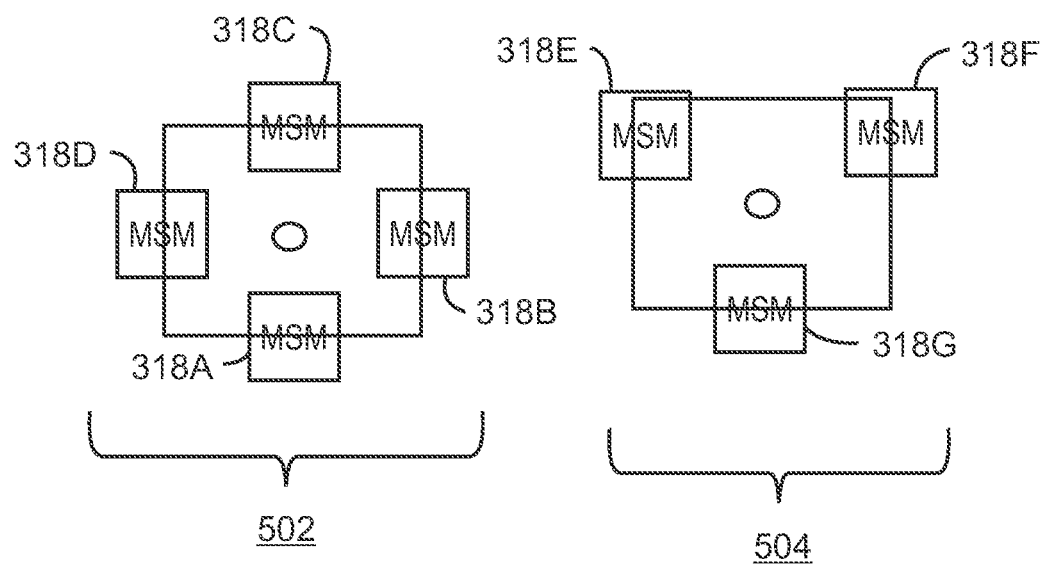
FIG. 5 is a block diagram illustrating different MSM actuator groups.

FIG. 5 is a block diagram illustrating different MSM actuator groups 502, 504. The first MSM actuator group 502 includes four MSM actuators 318A, 318B, 318C, and 318D. The second MSM actuator group 504 is an example that includes three MSM elements 318E, 318F, and 318G. The MSM actuator groups 502, 504 can be used, for example, in embodiments that include an OIS system and image capture device, for example, like that described with respect to FIG. 3. In an example that incorporates one or more motion sensors, the motion sensor(s) may be monitored for indications of detection of movements that may be deemed to arise from unsteady physical supporting of the image capture device. The one or more motion sensors may be any of a variety of types of motion sensing device based on any of a variety of technologies.

By way of example, the motion sensor(s) may include one or more accelerometers and/or gyroscopes to detect linear accelerations, detect a change in the direction of the force of gravity and/or detect rotational movement. Alternatively or additionally, one or more of the motion sensor(s) may be based on microelectromechanical systems (MEMS) technology. The feedback from the motion sensor(s) is analyzed and determines whether the detected motion includes relatively small movements that may be deemed to arise from unsteadiness in physically supporting the OIS system and image capture device. Upon determining that the detected motion arises from unsteady physical supporting of the capture device, a countering movement can be engaged by the proper MSM actuators 318A, 318B, 318C, and 318D of MSM actuator group 502, or MSM actuators 318E, 318F, and 318G of MSM actuator group 504. The countering movement of corresponding MSM actuators 318 may be driven by indications received from the motion sensors to provide OIS through the MSM actuator group 502, 504, providing OIS.

In different embodiments, providing OIS may entail operation of multiple MSM actuator groups 502, 504 and appropriate MSM elements 102 to move the camera and/or the lens. Upon deriving one or more countering movements, a countering movement component 506 may select one or more actuator group 502, 504 to use to effect those countering movements. In so doing, the countering movement component 506 may employ indications from configuration data of the geometry and/or other aspects of the manner in which the multiple MSM actuators are mechanically coupled to each other and/or coupled to the camera and/or the lens. The countering movement component 506 may operate the MSM driver to drive electric power to apply a magnetic field to the selected one or more of the MSM elements 102 of one or more MSM actuator groups 502, 504 to cause the countering movements. Each of the MSM actuators 318 may incorporate a piece of material that is responsive at a molecular level to the presence of a magnetic field to change shape and/or at least one dimension in a manner that may be harnessed to provide mechanical movement.

The diagram of FIG. 5 is not intended to indicate that the MSM actuator groups 502, 504 are to include all of the components shown in FIG. 5. Any number of additional components may be included, depending on the details of the devices and specific implementation of the ferrofluid material and OIS techniques described herein. For example, the items discussed are not limited to the functionalities mentioned, but the functions could be done in different places, or by different components.

Figure 6:
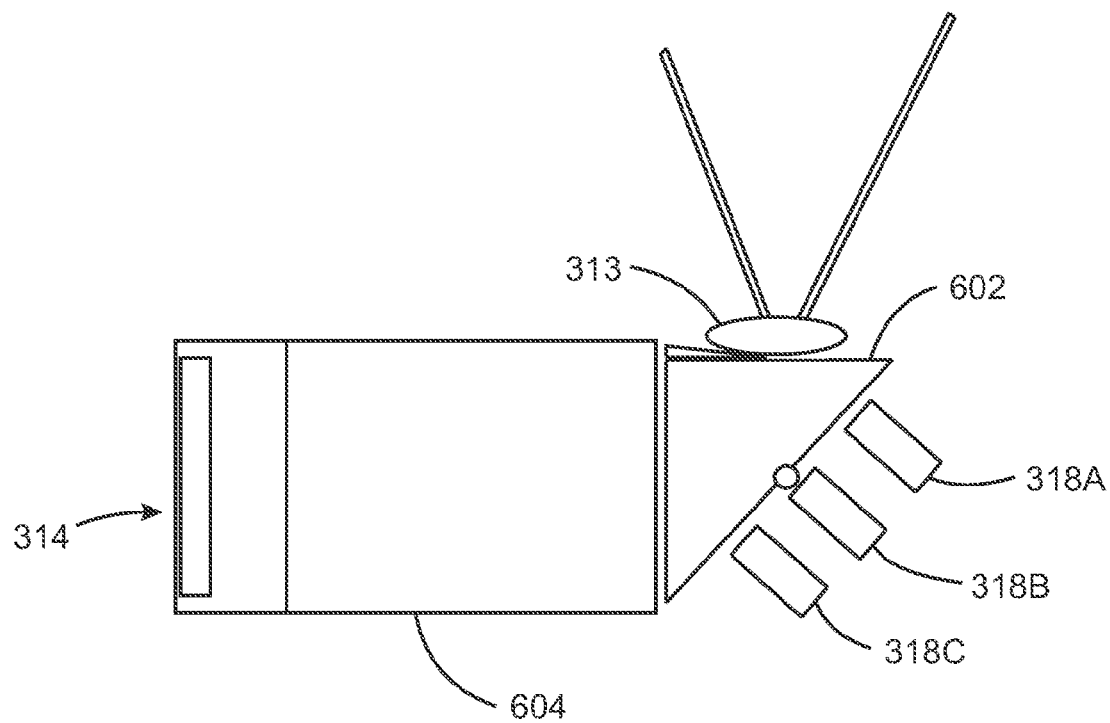
FIG. 6 is a block diagram of an example OIS system with a prism that pivots by MSM actuators.

FIG. 6 is a block diagram of an example OIS system 600 with a prism 602 that pivots by MSM actuators 318. Like numbered items can be described, for example, with respect to FIGS. 1A, 1B, 1C, 2, and 3. The MSM actuators 318 can include an MSM element 102 in an interface including a ferrofluid material 112 for increased magnetic flux and improved stability to the MSM element 102. The OIS system 600 includes an image capture element 314 coupled to a casing 604, which is coupled to the prism 602. The multiple MSM actuators 318 are coupled to the prism 602, and the prism 602 is coupled to a camera 313 and optical lens 315. The multiple MSM actuators 318 may cause the prism 602 and thus camera 313 to pivot about multiple axes and provide OIS during image capture. Unsteadiness in physically supporting the capture device 300 during the capturing of images can degrade the quality of the images captured. Such unsteadiness can cause relatively small movements of the capture device in various directions that can cause blurring in individual captured images and/or an undesirable visible shakiness in captured motion video. To address this, in examples, the MSM actuators 318 may operate on the prism 602 by processing information from the motion sensors to provide OIS. In some examples, the MSM actuators 318 may be so operated in response to particular types of motion detected by an analysis of multiple images captured by the camera 313 over time. In some examples, the MSM actuators 318 may be operated to cause such pivoting about the prism 602 along other axes in response to particular types of motion detected by, for example, a motion sensor.

In some examples, the camera 313, the lens 315, the motion sensor 315 and the MSM actuators 318 may be incorporated into the casing 604. In examples, the line of sight of the image capture element 314 may extend forward from the location of the camera 313 within the casing 604. The multiple MSM actuators 318 may be positioned around the periphery of the prism 602 to enable each to engage an edge of the lens prism 602 (or of a frame that may hold the lens prism 602) from differing directions. Each of the MSM actuators 318 may have a generally elongate shape, and may be arranged around the periphery of the lens 313 and/or prism 602 in what may be a radiating pattern that extends away from the periphery of the lens 313. In some embodiments, the MSM actuators 318 may be positioned about the lens 313 such that their lengthwise dimensions all extend within a single plane, and that single plane may be parallel to a portion of the casing 604 that defines at least a portion of the front surface.

The diagram of FIG. 6 is not intended to indicate that the OIS system 600 is to include all of the components shown in FIG. 6. Any number of additional components may be included within the OIS system 600, depending on the details of the devices and specific implementation of the ferrofluid material 112 and OIS techniques described herein. For example, the items discussed are not limited to the functionalities mentioned, but the functions could be done in different places, or by different components.

Figure 7A:
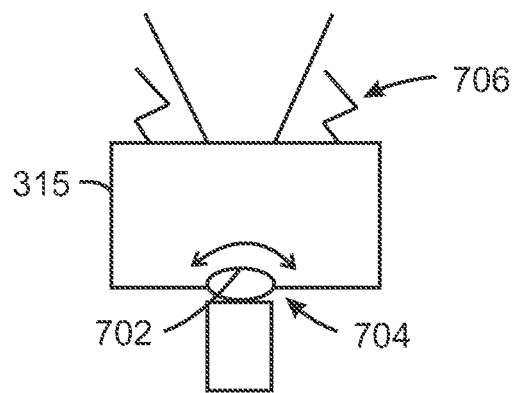
FIGS. 7A, 7B, and 7C are diagrams illustrating a lens configured to be coupled to a pivot point setting.
Figure 7B:
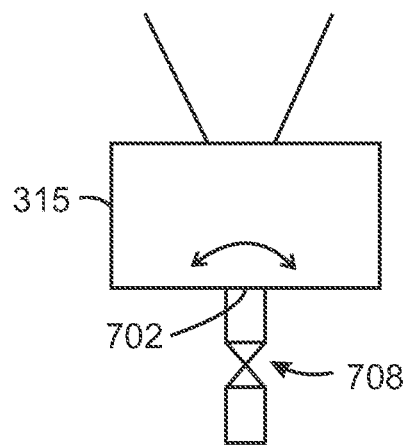
Figure 7C:
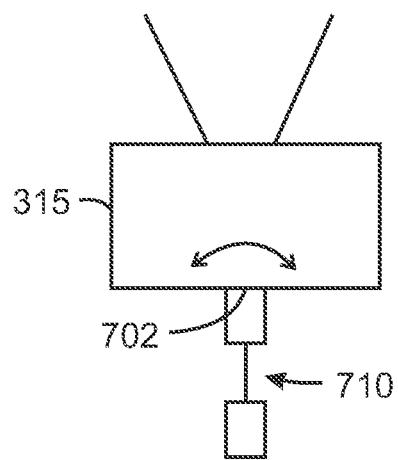

FIGS. 7A, 7B, and 7C are diagrams illustrating a lens 315 configured to be coupled to a pivot point setting. In FIG. 7A, the lens 315 is configured to be disposed on the pivot point 702. The pivot point 702 may include a ball joint 704 wherein springs 706 retain the lens 315 on the pivot point 702 while retaining range of movement. In FIG. 7B, the lens 315 is configured to be disposed on the pivot point 702 wherein a plastic mold 708 may be configured to retain the lens 315 on the pivot point 702 while retaining range of movement. FIG. 7C illustrates the lens 315 configured to be disposed on the pivot point 702 coupled to the lens 315. In FIG. 7C, a narrow wire 710 may be configured to retain the lens 315 on the pivot point 702 while retaining range of movement. Each of FIGS. 7A, 7B, and 7C can incorporate additional implementations not currently illustrated. For example, the pivot point 702 may additionally be coupled to a prism, such as the prism 602 from FIG. 6.

Figure 8:
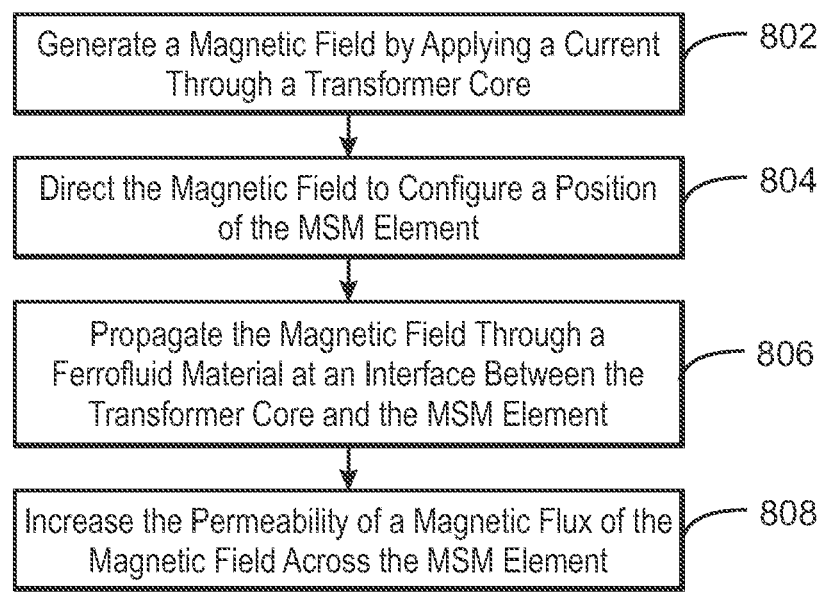
FIG. 8 is a process flow diagram of an example method for configuring and controlling magnetic flux across an MSM element utilizing a ferrofluid material in an interface.

FIG. 8 is a process flow diagram of an example method 800 for configuring and controlling magnetic flux across an MSM element utilizing a ferrofluid material in an interface. The method 800 begins at block 802, where a magnetic field is generated. The magnetic field can be generated, for example, by a magnetic transformer core or coil. At block 804, the magnetic field is directed to an MSM element. Due to the elongation and compression that a ferromagnetic MSM material undergoes when subjected to a magnetic field, the MSM element changes shape and size.

The method 800 continues at block 806, where the magnetic field is propagated through a ferrofluid material at an interface. The ferrofluid material is located in an interface between the MSM element receiving the magnetic flux and the magnetic core generating the magnetic field. The change in shape and size of the MSM element can create a gap at the interface between the transformer coil or magnetic core that is generating the magnetic field and the MSM element itself. This gap of the interface is filled with a ferrofluid material, thereby increasing the permeability of the magnetic flux across the MSM element, and enhancing the efficiency of a functioning MSM element, for example, as an MSM actuator.

At block 808, the permeability of the magnetic flux across the MSM element is increased by the ferrofluid material. The introduction of the ferrofluid material in what otherwise would be an empty interface between the MSM element and the magnetic cores now fills the interface with the ferrofluid material. With the interface filled, the ferrofluid material acts to significantly increase the magnetic permeability of the magnetic flux that is being applied to the MSM element.

In some embodiments, the method can include coupling the MSM element to a camera. The method can also include providing OIS for the camera through configuration of the MSM element. The MSM element can be a component of an actuator in an OIS system. In examples, the method can include exerting a mechanical force with the MSM element to pivot a camera along a line of sight during an image capture. In some examples, a tilting a prism can be coupled to a lens of a camera via the MSM element to provide OIS for the camera.

It is to be understood that the process flow diagram of FIG. 8 is not intended to indicate that the method 800 is to include all of the blocks shown in FIG. 8 in every case. Further, any number of additional blocks can be included within the method 800, depending on the details of the specific implementation.

EXAMPLES

Example 1 is an apparatus for decreasing magnetic flux resistance. In this example, the wireless charging device may include a magnetic shape-memory (MSM) element disposed between a first core and a second core, and a ferrofluid material disposed in a first interface between the MSM element and the first core, and disposed in a second interface between the MSM element and the second core. In this example, the ferrofluid material is configured to decrease a resistance of a magnetic flux between the first core and the second core.

Example 2 includes the apparatus of example 1. In this example, the first magnetic core and the second magnetic core may include a magnetic coil and transformer, and wherein the first magnetic core and the second magnetic core are configured to generate the magnetic flux when induced with a current.

Example 3 includes the apparatus of any combination of examples 1-2. In this example, the MSM element is configured to elongate when exposed to the magnetic flux generating a gap at the first and second interface, and wherein the ferrofluid material is configured to fill the gap.

Example 4 includes the apparatus of any combination of examples 1-3. This example includes a container to contain the ferrofluid material within the first and second interfaces.

Example 5 includes the apparatus of any combination of examples 1-4. This example includes a magnet disposed between the first core and the MSM, and a magnet disposed between the second core and the MSM.

Example 6 includes the apparatus of any combination of examples 1-5. In this example, the magnets are configured to maintain the ferrofluid material in a position within the interfaces.

Example 7 includes the apparatus of any combination of examples 1-6. In this example, the ferrofluid material increases the magnetic permeability of the magnetic flux between the first core and the second core.

Example 8 includes the apparatus of any combination of examples 1-7. In this example, the MSM element is a component of an actuator in an optical image stabilization system.

Example 9 includes the apparatus of any combination of examples 1-8. In this example, the MSM element is configured to exert a mechanical force to pivot a camera along a line of sight during image capture.

Example 10 includes the apparatus of any combination of examples 1-9. This example includes a prism coupled to a lens of a camera. In this example, the MSM element is configured to tilt the prism and provide optical image stabilization for the camera.

Example 11 is a method for increasing the magnetic flux applied to a magnetic shape-memory (MSM) element. In this example, the wireless charging device may include generating a magnetic field by applying a current through a transformer core, directing the magnetic field to configure a position of the MSM element, propagating the magnetic field through a ferrofluid material at an interface between the transformer core and the MSM element, and increasing the permeability of a magnetic flux of the magnetic field across the MSM element.

Example 12 includes the method of example 11. This example includes reducing buckling of the MSM element at the interface with the ferrofluid material.

Example 13 includes the method of any combination of examples 11-12. This example includes circulating the ferrofluid material within the interface around the MSM element.

Example 14 includes the method of any combination of examples 11-13. This example includes increasing heat transfer from the MSM element to the interface. In this example, the ferrofluid material is in contact with the MSM element and absorbs heat from the MSM element.

Example 15 includes the method of any combination of examples 11-14. This example includes reducing noise produced by the MSM element by reinforcing the structure of the MSM element with the ferrofluid material in the interface.

Example 16 includes the method of any combination of examples 11-15. This example includes coupling the MSM element to a camera.

Example 17 includes the method of any combination of examples 11-16. This example includes providing optical image stabilization for the camera through configuration of the MSM element.

Example 18 includes the method of any combination of examples 11-17. In this example, the MSM element is a component of an actuator in an optical image stabilization system.

Example 19 includes the method of any combination of examples 11-18. This example includes exerting a mechanical force with the MSM element to pivot a camera along a line of sight during an image capture.

Example 20 includes the method of any combination of examples 11-19. This example includes tilting a prism coupled to a lens of a camera via the MSM element to provide optical image stabilization for the camera.

Example 21 is a system for decreasing magnetic flux resistance. In this example, the wireless charging device may include a first magnetic core and a second magnetic core configured to generate the magnetic flux when induced with a current, a magnetic shape-memory (MSM) element disposed between a first core and a second core, and a ferrofluid material disposed in a first interface between the MSM element and the first core, and disposed in a second interface between the MSM element and the second core. In this example, the ferrofluid material is configured to decrease a resistance of the magnetic flux between the first core and the second core.

Example 22 includes the system of example 21. In this example, the first magnetic core and the second magnetic core may include a magnetic coil and transformer, and wherein the first magnetic core and the second magnetic core are configured to generate the magnetic flux when induced with a current.

Example 23 includes the system of any combination of examples 21-22. In this example, the MSM element is configured to elongate when exposed to the magnetic flux generating a gap at the first and second interface, and wherein the ferrofluid material is configured to fill the gap.

Example 24 includes the system of any combination of examples 21-23. This example includes a container to contain the ferrofluid material within the first and second interfaces.

Example 25 includes the system of any combination of examples 21-24. This example includes a magnet disposed between the first core and the MSM, and a magnet disposed between the second core and the MSM.

Example 26 includes the system of any combination of examples 21-25. In this example, the magnets are configured to maintain the ferrofluid material in a position within the interfaces.

Example 27 includes the system of any combination of examples 21-26. In this example, the ferrofluid material increases the magnetic permeability of the magnetic flux between the first core and the second core.

Example 28 includes the system of any combination of examples 21-27. In this example, the MSM element is a component of an actuator in an optical image stabilization system.

Example 29 includes the system of any combination of examples 21-28. In this example, the MSM element is configured to exert a mechanical force to pivot a camera along a line of sight during image capture.

Example 30 includes the system of any combination of examples 21-29. This example includes a prism coupled to a lens of a camera. In this example, the MSM element is configured to tilt the prism and provide optical image stabilization for the camera.

Example 31 is an apparatus for decreasing magnetic flux resistance. In this example, the wireless charging device may include a means for magnetic shape-memory (MSM) disposed between a first core and a second core, and a ferrofluid material disposed in a first interface between the means for magnetic shape-memory and the first core, and disposed in a second interface between the means for MSM and the second core. In this example, the ferrofluid material is configured to decrease a resistance of a magnetic flux between the first core and the second core.

Example 32 includes the apparatus of example 31. In this example, the first magnetic core and the second magnetic core may include a magnetic coil and transformer, and wherein the first magnetic core and the second magnetic core are configured to generate the magnetic flux when induced with a current.

Example 33 includes the apparatus of any combination of examples 31-32. In this example, the means for MSM is configured to elongate when exposed to the magnetic flux generating a gap at the first and second interface, and wherein the ferrofluid material is configured to fill the gap.

Example 34 includes the apparatus of any combination of examples 31-33. This example includes a container to contain the ferrofluid material within the first and second interfaces.

Example 35 includes the apparatus of any combination of examples 31-34. This example includes a magnet disposed between the first core and the MSM, and a magnet disposed between the second core and the MSM.

Example 36 includes the apparatus of any combination of examples 31-35. In this example, the magnets are configured to maintain the ferrofluid material in a position within the interfaces.

Example 37 includes the apparatus of any combination of examples 31-36. In this example, the ferrofluid material increases the magnetic permeability of the magnetic flux between the first core and the second core.

Example 38 includes the apparatus of any combination of examples 31-37. In this example, the means for MSM is a component of an actuator in an optical image stabilization system.

Example 39 includes the apparatus of any combination of examples 31-38. In this example, the means for MSM is configured to exert a mechanical force to pivot a camera along a line of sight during image capture.

Example 40 includes the apparatus of any combination of examples 31-39. This example includes a prism coupled to a lens of a camera. In this example, the means for MSM is configured to tilt the prism and provide optical image stabilization for the camera.

Example 41 is a system for decreasing magnetic flux resistance. In this example, the wireless charging device may include a first magnetic core and a second magnetic core configured to generate the magnetic flux when induced with a current, a means for magnetic shape-memory (MSM) disposed between a first core and a second core, and a ferrofluid material disposed in a first interface between the means for MSM and the first core, and disposed in a second interface between the means for MSM and the second core. In this example, the ferrofluid material is configured to decrease a resistance of the magnetic flux between the first core and the second core.

Example 42 includes the apparatus of example 41. In this example, the first magnetic core and the second magnetic core may include a magnetic coil and transformer, and wherein the first magnetic core and the second magnetic core are configured to generate the magnetic flux when induced with a current.

Example 43 includes the apparatus of any combination of examples 41-42. In this example, the means for MSM is configured to elongate when exposed to the magnetic flux generating a gap at the first and second interface, and wherein the ferrofluid material is configured to fill the gap.

Example 44 includes the apparatus of any combination of examples 41-43. This example includes a container to contain the ferrofluid material within the first and second interfaces.

Example 45 includes the apparatus of any combination of examples 41-44. This example includes a magnet disposed between the first core and the MSM, and a magnet disposed between the second core and the MSM.

Example 46 includes the apparatus of any combination of examples 41-45. In this example, the magnets are configured to maintain the ferrofluid material in a position within the interfaces.

Example 47 includes the apparatus of any combination of examples 41-46. In this example, the ferrofluid material increases the magnetic permeability of the magnetic flux between the first core and the second core.

Example 48 includes the apparatus of any combination of examples 41-47. In this example, the means for MSM is a component of an actuator in an optical image stabilization system.

Example 49 includes the apparatus of any combination of examples 41-48. In this example, the means for MSM is configured to exert a mechanical force to pivot a camera along a line of sight during image capture.

Example 50 includes the apparatus of any combination of examples 41-49. This example includes a prism coupled to a lens of a camera. In this example, the means for MSM is configured to tilt the prism and provide optical image stabilization for the camera.

In the foregoing description, numerous specific details have been set forth, such as examples of specific types of system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

In the above description and the following claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices.

An embodiment is an implementation or example. Reference in the present specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for decreasing magnetic flux resistance, comprising:
   a magnetic shape-memory (MSM) element disposed between a first core and a second core; and
   a ferrofluid material disposed in a first interface between the MSM element and the first core, and disposed in a second interface between the MSM element and the second core, wherein the ferrofluid material is configured to decrease a resistance of a magnetic flux between the first core and the second core.

2. The apparatus of claim 1, wherein the first core and the second core comprise a magnetic coil and transformer, and wherein the first core and the second core are configured to generate the magnetic flux when induced with a current.

3. The apparatus of claim 1, wherein the MSM element is configured to elongate when exposed to the magnetic flux generating a gap at the first and second interface, and wherein the ferrofluid material is configured to fill the gap.

4. The apparatus of claim 1, further comprising a container to contain the ferrofluid material within the first and second interfaces.

5. The apparatus of claim 1, further comprising:
   a magnet disposed between the first core and the MSM; and
   a magnet disposed between the second core and the MSM.

6. The apparatus of claim 5, wherein the magnet disposed between the first core and the MSM, and the magnet disposed between the second core and the MSM are configured to maintain the ferrofluid material in a position within the first and second interfaces.

7. The apparatus of claim 1, wherein the ferrofluid material increases a magnetic permeability of the magnetic flux between the first core and the second core.

8. The apparatus of claim 1, wherein the MSM element is a component of an actuator in an optical image stabilization system.

9. The apparatus of claim 1, wherein the MSM element is configured to exert a mechanical force to pivot a camera along a line of sight during image capture.

10. The apparatus of claim 1, further comprising a prism coupled to a lens of a camera, wherein the MSM element is configured to tilt the prism and provide optical image stabilization for the camera.

11. A method for increasing magnetic flux applied to a magnetic shape-memory (MSM) element, comprising:
    generating a magnetic field by applying a current through a transformer core;
    directing the magnetic field to configure a position of the MSM element;
    propagating the magnetic field through a ferrofluid material at an interface between the transformer core and the MSM element; and
    increasing a permeability of a magnetic flux of the magnetic field across the MSM element.

12. The method of claim 11, further comprising reducing buckling of the MSM element at an interface with the ferrofluid material.

13. The method of claim 11, further comprising circulating the ferrofluid material within an interface around the MSM element.

14. The method of claim 13, further comprising increasing heat transfer from the MSM element to the interface around the MSM element, wherein the ferrofluid material is in contact with the MSM element and absorbs heat from the MSM element.

15. The method of claim 11, further comprising reducing noise produced by the MSM element by reinforcing a structure of the MSM element with the ferrofluid material in the interface between the transformer core and the MSM element.

16. The method of claim 11, further comprising coupling the MSM element to a camera.

17. The method of claim 16, further comprising providing optical image stabilization for the camera through configuration of the MSM element.

18. The method of claim 11, wherein the MSM element is a component of an actuator in an optical image stabilization system.

19. The method of claim 11, further comprising exerting a mechanical force with the MSM element to pivot a camera along a line of sight during an image capture.

20. The method of claim 11, further comprising tilting a prism coupled to a lens of a camera via the MSM element to provide optical image stabilization for the camera.

21. A system for decreasing magnetic flux resistance, comprising:
   a first core and a second core configured to generate a magnetic flux when induced with a current;
   a magnetic shape-memory (MSM) element disposed between a first core and a second core; and
   a ferrofluid material disposed in a first interface between the MSM element and the first core, and disposed in a second interface between the MSM element and the second core, wherein the ferrofluid material is configured to decrease a resistance of the magnetic flux between the first core and the second core.

22. The system of claim 21, wherein the ferrofluid material increases a permeability of the magnetic flux applied across the MSM element.

23. The system of claim 21, wherein the MSM element is a component of an actuator in an optical image stabilization device.

24. The system of claim 23, wherein the MSM element is configured to exert a mechanical force to pivot a camera along a line of sight during an image capture.

25. The system of claim 21, further comprising a prism coupled to a lens of a camera, wherein the MSM element is configured to tilt the prism and provide optical image stabilization for the camera.

* * * * *